(12) United States Patent
Millman et al.

(10) Patent No.: US 11,546,370 B2
(45) Date of Patent: Jan. 3, 2023

(54) ANTI-REPLAY PROTECTION FOR NETWORK PACKET COMMUNICATIONS

(71) Applicant: NXP USA, Inc., Austin, TX (US)

(72) Inventors: Steve D. Millman, Gilbert, AZ (US); Michael J. Torla, Chandler, AZ (US); David Abdoo, Burtchville, MI (US)

(73) Assignee: NXP USA, Inc., Austin, TX (US)

( * ) Notice: Subject to any disclaimer, the term of this patent is extended or adjusted under 35 U.S.C. 154(b) by 670 days.

(21) Appl. No.: 15/884,534

(22) Filed: Jan. 31, 2018

(65) Prior Publication Data

US 2019/0238585 A1  Aug. 1, 2019

(51) Int. Cl.
*H04L 29/06* (2006.01)
*H04L 9/40* (2022.01)

(52) U.S. Cl.
CPC ...... *H04L 63/1441* (2013.01); *H04L 63/0428* (2013.01); *H04L 63/1416* (2013.01); *H04L 63/1466* (2013.01)

(58) Field of Classification Search
CPC ............. H04L 63/1411; H04L 63/0428; H04L 63/1416; H04L 63/1466; H04L 63/1441
USPC .......................................................... 726/23
See application file for complete search history.

(56) References Cited

U.S. PATENT DOCUMENTS

| | | | |
|---|---|---|---|
| 7,600,131 B1 | 10/2009 | Krishna et al. | |
| 8,191,133 B2* | 5/2012 | Khanna | H04L 63/1466 726/12 |
| 8,646,090 B1* | 2/2014 | Gadde | H04L 12/6418 726/13 |
| 2004/0205332 A1 | 10/2004 | Bourchard et al. | |

* cited by examiner

*Primary Examiner* — Evans Desrosiers

(57) ABSTRACT

Methods and systems are disclosed for anti-replay protection for network packet communications. A scorecard is stored that includes packet sequence numbers for received packets associated with a network packet flow. For each received packet, an anti-replay unit accesses the scorecard for an initial check to determine if the current packet represents a late packet and/or a replay packet. After further processing, the anti-replay unit accesses the scorecard for a final check to determine if the current packet represents a replay packet. For one embodiment, the initial check uses a first window of packet sequence numbers, and the final check uses a second window of packet sequence numbers that is larger than the first window. For further embodiments, multiple processing units operate in parallel to process received packets and to share the anti-replay unit, and each processing unit requests initial and final checks for received packets it processes.

18 Claims, 4 Drawing Sheets

ANTI-REPLAY PROTECTION FOR NETWORK PACKET COMMUNICATIONS

TECHNICAL FIELD

This technical field relates to network packet communications and, more particularly, to anti-replay protection for packets received within a packet flow for network packet communications.

BACKGROUND

Network security is often a significant issue in communication networks. One technique that has been used to protect network communications is to apply encryption to network packets being communicated between one or more network nodes. If an encrypted packet is intercepted by a malicious actor, the encryption can keep this malicious actor from determining the actual contents of the packet. However, the malicious actor can still disrupt network communications and related security by various actions. One possible malicious action is to modify the packet even though the contents are not known, and such modifications can potentially lead to undesired results if the modifications happen to produce a modified packet that is meaningful to the receiving device. Another possible malicious action is to resend the intercepted packet a large number of times to flood the receiving device with additional duplicate packets. A further possible malicious action is to send random-numbered packets, for example where packet sequence numbers are being used for security purposes, to interfere with detection windows used for analysis of packet sequence numbers. Other malicious actions could also be taken.

To address malicious packet modifications, transmitting and receiving network nodes can use a variety of techniques. One technique is to use packet sequence numbers to determine if packets have been transmitted out of sequence as transmission out of sequence is a possible indication of an intervening malicious actor. Another technique is to apply complicated data confirmation algorithms. These algorithms can be applied to packet contents to generate a resulting value that can be transmitted by the transmitting node and then re-generated and compared at the receiving node to determine if the contents of the packet have been modified. Further, if encryption is applied by the transmitting node, related decryption can be performed at the receiving node to recover full contents of the received network packets before applying the data confirmation algorithm. To address malicious transmission of duplicate packets, anti-replay checks can be applied by the receiving node to determine if late packets and/or duplicate packets are being received. Typically, for such an anti-replay check, a packet window is used to check a selected window of received packets for late packets or replay packets rather than attempting to store all packets within a network packet flow.

When anti-replay checks are required for packets within a packet flow, a scorecard is often generated and stored as a table in memory to indicate which packet sequence numbers have been received. When a packet arrives, its packet sequence number is extracted and compared to the scorecard with three possible outcomes. The received packet is considered a "late" packet if its packet sequence number is older than the oldest packet sequence number the scorecard is currently tracking. The received packet is considered a "replay" packet if its packet sequence number has already been received within the packets currently being tracked within the scorecard. Finally, the received packet is considered a "good" packet if neither of the above cases is true. If the packet is a "good" packet, then one of two update actions can then be taken with respect to the scorecard. If the packet sequence number is older than the newest packet sequence number currently stored within the scorecard, then the packet sequence number is added to and stored within the scorecard. If the packet sequence number is newer than the newest packet sequence number stored in the scorecard, the scorecard is shifted such that the packet sequence number is now the newest packet sequence number. As indicated above, a finite packet window is typically used because it is often not practical to track all of the packets (e.g., potentially millions) that may be transmitted within a particular network packet flow. As such, for late packet and replay packet checks, the packet sequence number for the current received packet is typically compared to packet sequence numbers stored for a subset of packets within the packet flow that were received within the finite packet window.

For encrypted packet communications, prior solutions have required that the anti-replay and late packet checks process received packets for a packet flow in the order in which they are received because the packet window for the scorecard cannot be updated until full decryption has completed successfully and the full packet contents have been deemed secure. For example, where a data confirmation algorithm is applied to the full packet contents, decryption must fully complete before this data confirmation algorithm can be successfully applied. As such for these prior solutions, the scorecard is only updated for a packet once the packet has been received, fully decrypted, and verified to be a good and secure packet such that decryption and authentication processing for the packet are both successful.

This requirement for full decryption and authentication processing can cause system degradation in certain environments. For example, consider a sequence of packets where some are large packets and some are small packets. For purposes of this example, assume four (4) such packets are received, and they are slated to be processed in parallel by four (4) different processing units. For this example, the packets are denoted A, B, C, and D where A is a very large packet and received first. B, C, and D are subsequently received and are all small packets. For prior solutions, the processing units handling jobs B, C, and D will stall until the processing unit handling job A is completely done so that the scorecard can be updated in order of packet reception. In other words, the processing units handling B-D remain idle until the processing unit handling packet A completely finishes its processing of packet A. Thus, in order to keep all processing units as busy as possible, prior solutions restricted anti-replay processing to serial operations where only one packet from a packet flow was processed at a time. As such, with M different processing units for prior solutions, M different packet flows could be handled in parallel but all of the packets from a single packet flow would have to be handled by a single processing unit.

As packet network speeds are increased for packet flows, however, each processing unit is forced to operate at increasingly higher rates in order to process serially the packets being received within the packet flow it is processing. Unfortunately, processing units have not been able to keep up with the increased packet rates needed for such serial packet processing. For example, if processing units can serially process received packets within a packet flow at a maximum rate of 2.5 to 3 Gbps (Gigabits per second), such processing units would not be able to process the received packets if the packet rates are increased above 3 Gbps. Further, it is now desirable to achieve packet processing rates for received packets within a packet flow at 20-50 Gbps or more. Prior solutions for anti-replay checks are not able to achieve these desired packet processing rates.

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale.

DETAILED DESCRIPTION

Methods and systems for anti-replay protection for network packet communications are disclosed that achieve higher packet processing rates by introducing initial anti-replay checks and later final anti-replay checks that facilitate parallel processing of received packets from a packet flow by multiple different processing units. As described herein, the disclosed embodiments use these initial/final checks by anti-replay units and related messaging between anti-replay units and processing units to allow the parallel processing of received packets for anti-replay checks. Because the anti-replay processing can be done in parallel without forcing processing units to serially process packets within a packet flow, the disclosed embodiments allow network systems to meet more aggressive packet rate requirements without requiring the use of significant additional hardware resources. A variety of additional and/or different features and variations can also be implemented.

Figure 1:
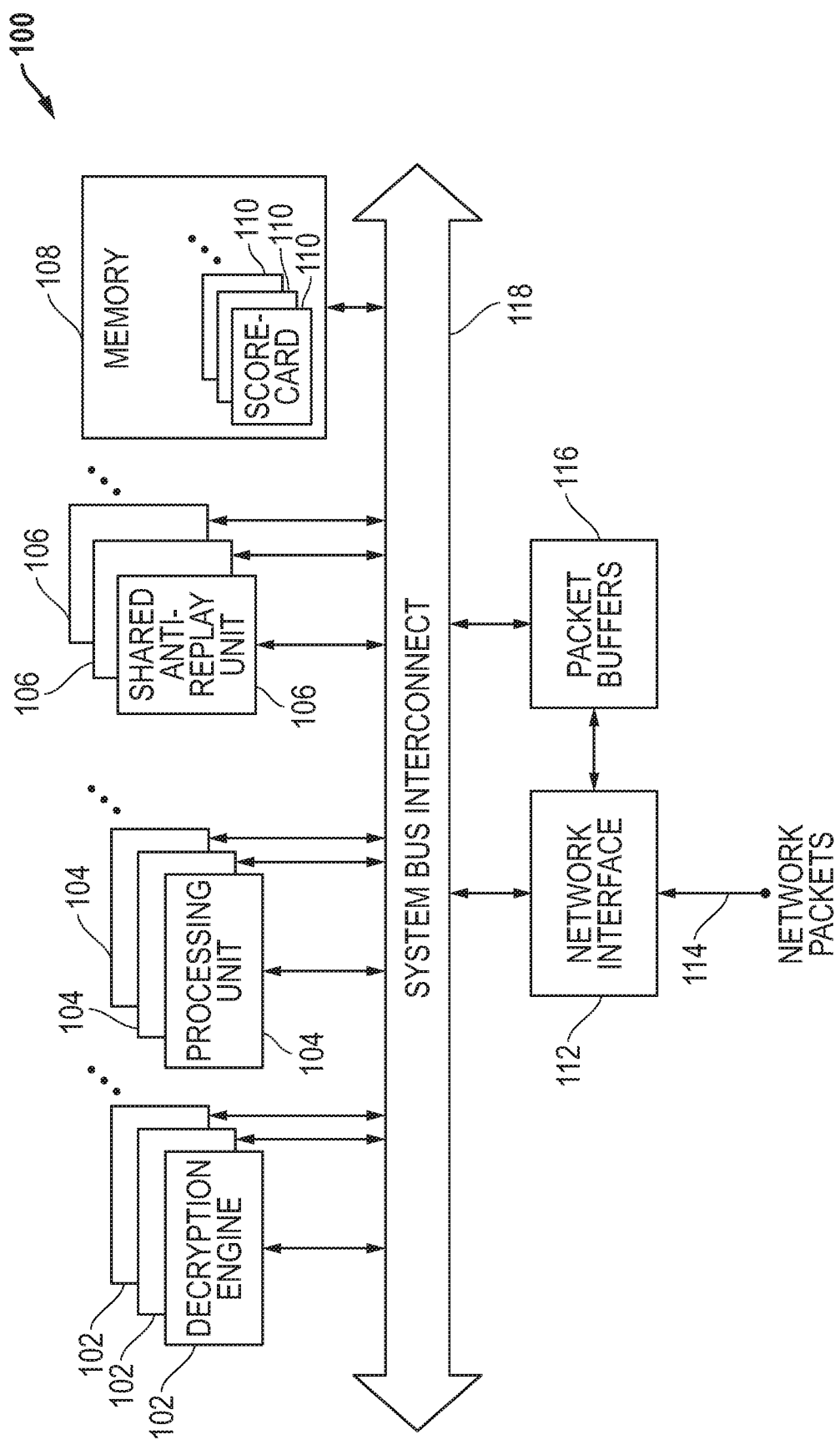
FIG. 1 is a block diagram of an example network system configured to receive and process incoming network packets within network packet flows, including encrypted network packets, while providing parallel processing that includes anti-replay checks.

FIG. 1 is a block diagram of an example embodiment for a network system 100 configured to receive and process incoming network packets 114 within network packet flows, including encrypted network packets, while providing parallel processing that includes anti-replay checks. For the example embodiment depicted, a network interface 112 receives incoming network packets 114 from one or more transmitting network nodes. These incoming network packets 114 can include received packets from one or more network packet flows. The received packets 114 can be stored by the network interface in one or more packet buffers 116. The network interface 112 and the packet buffers 116 are coupled to system bus interconnect 118, which can include one or more data buses and interconnection nodes that provide internal data communications among various components for the receiving network system 100.

As described herein, multiple processing units 104 communicate through the system bus interconnect 118 with the network interface 112 and/or the packet buffers 116 to obtain and process the received network packets 114. As part of this processing of received network packets 114, the processing units 104 are configured to use one or more decryption engines 102 to decrypt the received network packets 114. Additional security and/or other processing can also be conducted by the processing units 104. As further described herein, a plurality of anti-replay units 106 can be accessed, shared, and used by the processing units 104 to provide anti-replay checks for the incoming network packets 114. As part of this anti-replay check processing, one or more scorecards 110 can be accessed by the anti-replay units 106 to determine if late and/or replay packets have been received. The scorecards 110 store tables representing packet sequence numbers for received packets within selected windows of packets with respect to a newest packet. The scorecards 110 are stored within a memory 108, which can be implemented as one or more memory circuits. The decryption engines 102, the processing units 104, the shared anti-replay units 106, and the memory 108 are coupled to the system bus interconnect 118 and can communicate with each other and/or additional system components.

As described herein, anti-replay processing is performed twice per packet by the anti-replay unit 106 being used for a packet flow. The first time is an initial check where the scorecard 110 is not updated, and the second time is a final check where the scorecard 110 is updated. For certain embodiments, the initial and final anti-replay checks are different in that the second final check uses a larger packet window in order to better handle a situation where a long packet is followed by smaller ones. For one example embodiment described herein, the first initial check uses a 32-bit window, a 64-bit window, or a 128-bit window, and the second final check uses a 1024-bit window. The first window size can also be selected by a user to enforce a desired window size in the determination of "late" packets based upon the order that they are received. In this manner, the first initial check will indicate anything outside the 32/64/128-bit window as late and any duplicates within the 32/64/128-bit window would be replays. It is also noted that for the "replay" check portion of this initial check, the size for the first window can be increased up to the full size of the scorecard 110 for purposes of the "replay" check even though the smaller size is still used for the "late" check within this initial check determination.

Once a packet passes this initial check, it is known that the packet is not late for that user-selected window size. The second final check then performs a "replay" determination with a larger window size without making a "late" determination. However, while a "late" determination is not conducted in the final check stage, a check can still be made to determine if the packet is within a range of packets stored within the second window. For example, where a packet sequence number for a received packet is outside a range of packet sequence numbers stored in the second window, an indication can be generated that the "replay" condition for that packet is not determinable rather than being a definite "YES" or "NO" replay determination. Further, where small window sizes are used for the initial replay determination, it is important to allow the second window to be significantly larger than the first in order to prevent a large packet with the same packet number as a subsequent smaller packet from sneaking through without being flagged as a replay. For example, the bit size for the second window can be at least sixteen times larger than the bit size for the first window.

For embodiment where multiple processing units 104 share the same anti-replay unit 106, the size used for the second window can be selected based upon the size selected for the first window and/or the number of processing units 104. For example, when the size for the first window is selected to be small (e.g., 16 entries, 32 entries, other sizes of 32 entries or fewer), a large size (e.g., 1024 entries or more) can be used for the second window in the final check. This large size for the second window where the first window is small provides the detection advantages described herein. However, when the size for the first window is larger (e.g., 512 entries, 1024 entries, or more), it is less important for the size for the second window to be proportionally larger. For example, when the size for the first window is selected to be 1024 entries for the first check, the same number of 1024 entries can also be used for the second window in the final check. Further, as a general rule, the more processing units 104 there are using a shared anti-replay unit 104 to process packets within a packet flow, the bigger it is preferred that the second window be for the final check. For example, it has been found that issues arise when a second window of 16 entries is used where sixteen processing units 104 are processing packets from a packet flow using a shared anti-replay unit 106. Thus, as indicated above, the size used for the second window can be selected based upon the size selected for the first window and/or the number of processing units 104. It is further noted that other parameters could also be used for this selection while still taking advantage of the techniques described herein.

When one of the anti-replay units 106 operate, the anti-replay unit 106 first performs the initial anti-replay check. For this initial check, the anti-replay unit 106 identifies and compares the packet sequence number for the current packet with packet sequence numbers represented within the scorecard 110 for packets within a particular packet reception window. If the packet sequence number is older than any packet sequence number in the window, then the packet is identified as a "late" packet. If packet sequence number for the current packet falls within the window but that packet sequence number is already marked as having been received, then the packet is identified as a "replay" packet. If neither of the above are indicated, then the packet is cleared as having passed the initial check. If the packet also passes a final check as described herein, the packet is marked as having been successfully received by the receiving network system 100. Further, the detection window is shifted when the current packet is the newest packet received, and this newest packet is marked.

As further described herein, the anti-replay units 106 check for "late" and "replay" packets with respect to a user-selected window during the initial check by the processing units 104 based upon an extracted packet sequence number. The anti-replay units 106 then perform only a "replay" check in the final check after other security processing of the entire received packet is completed by the processing unit 104. This final check, for example, can preferably use a largest allowed window. The scorecard 110 is then updated after this final check processing. By applying and separating these initial and final checks, the disclosed embodiments allow parallel processing of received packets from a network packet flow while still properly handling anti-replay checks using scorecards.

The anti-replay units 106 are accessible to and can be shared by the processing units 104. Each processing unit 104 can request the use of one of the anti-replay units 106 if a packet arrives that is eligible for parallel processing and is not already part of a packet flow being processed in one of the anti-replay units 106. If an anti-replay unit 106 is available, then that anti-replay unit 106 will perform the anti-replay processing for all the processing units 104 that handle packets from that same packet flow. As such, when a packet requiring anti-replay processing arrives in a processing unit 104 and that the scorecard 110 for that packet flow is already being used by an anti-replay unit 106, the acquisition of an anti-replay unit 106 by the processing unit 104 is not required. If an anti-replay unit 106 is not available, then the processing unit 104 can be configured to handle the anti-replay computation and processing in a default serial mode similar to prior solutions. This allows the network system 100 to switch back and forth between handling a few packet flows where each is handled in parallel and handling a larger number of packets flows where each is handled serially. This flexibility allows the network system 100 to balance itself to keep the maximum number of processing units 104 busy at any given time.

Once an anti-replay unit 106 is acquired by a processing unit 104, the acquiring processing unit 104 requests an initial check of the packet sequence number from the anti-replay unit 106. Once this initial check is done, the processing unit 104 indicates that the received packet has cleared the initial check so that an initial check for another received packet from the packet flow can be performed for another processing unit 104. It is noted that these initial checks are requested by the processing units 104 operating in parallel in the order that the packets 114 are received by the system 100. The timing of these initial check requests by the processing units 104, however, is independent of the size of each received packet 114 because the initial check is requested at the start of processing once the packet sequence number is identified rather than waiting for security processing of the entire packet to be completed. In this initial check phase, the scorecard 110 is checked by the anti-replay unit 106 but is not updated. The scorecard 110 is updated only after the final check has been performed and cleared by the anti-replay unit 106, which occurs after the security processing of the received packet has been completed by the processing unit 104. It is further noted that such early initial checks based upon packet sequence numbers allow for proper "late" packet determinations where a very long packet is received and then followed by many short packets. In contrast, a late check only after security processing has completed could result in an improper indication of a "late" packet for the long packet, even though the packets were received in proper order, due to the time it takes to process the long packet as opposed to the time it takes to process the short packets.

Once the processing unit 104 completes its security processing of the received packet, it requests the anti-replay unit 106 to perform a final check and to update the scorecard 110 if the final check clears. It is noted that late errors are not checked at this final check stage because they were checked for in the initial check stage. Further as indicated above, a re-check of "late" packet status at the final stage could lead to an improper "late" determination, such as where a long packet is followed by many short packets.

In contrast, replay errors are again checked at this final check stage. As indicated above, although a "late" determination is not conducted in the final check stage, a check can still be made to determine if the packet is within a range of packets stored within the second window. For example, where a packet sequence number for a received packet is outside a range of packet sequence numbers stored in the second window, an indication can be generated that the "replay" condition for that packet is not determinable rather than being a definite "YES" or "NO" replay determination. It is further noted that which of two received packets is indicated as a replay packet as opposed to a first-received packet for this initial/final check processing can be different from what would have been identified in prior solutions that serially process received packets because the parallel packet processing described herein can finish in a different order. For most applications, however, the indication of which packet is the replay packet is not significant as most network transmission protocols can lead to transmitted packets being received in non-definite packet order.

For one embodiment, when a processing unit 104 is ready to share a job with another processing unit 104, the second unit gets a copy of the job from the first unit. For consistency, the anti-replay unit 106 handling the packet flow can be configured to snoop the copy transaction and insert the latest packet sequence number information so that the next processing unit has the latest information. It is further noted that the next processing unit 104 is not required to have the entire updated scorecard 110; rather, the next processing unit 104 simply needs enough information so that it can properly decrypt the packet associated with the job being transferred.

The anti-replay units 106 can also be configured to keep track of how many processing units 104 are referencing and sharing them to process packets within a packet flow. When the last of these processing units 104 requests a release of the anti-replay unit 106, the anti-replay unit 106 can deny the request so that the processing unit 104 retains the anti-replay unit 106. This allows the anti-replay unit 106 time to write the now updated scorecard 110 it may be tracking separately to memory 108. Once the update to memory 108 is completed, the anti-replay unit 106 notifies the processing unit 104 and the processing unit 104 is able to complete the job. It is further noted that when a processing unit 104 is waiting for the scorecard 110 to be updated in memory 108, logic can be implemented to monitor notifications in order to allow the processing unit 104 to move on to the next job. This additional logic allows the maximum number of processing units 104 to be in use at any given time thereby providing the ability to handle higher packet rates.

Figure 2:
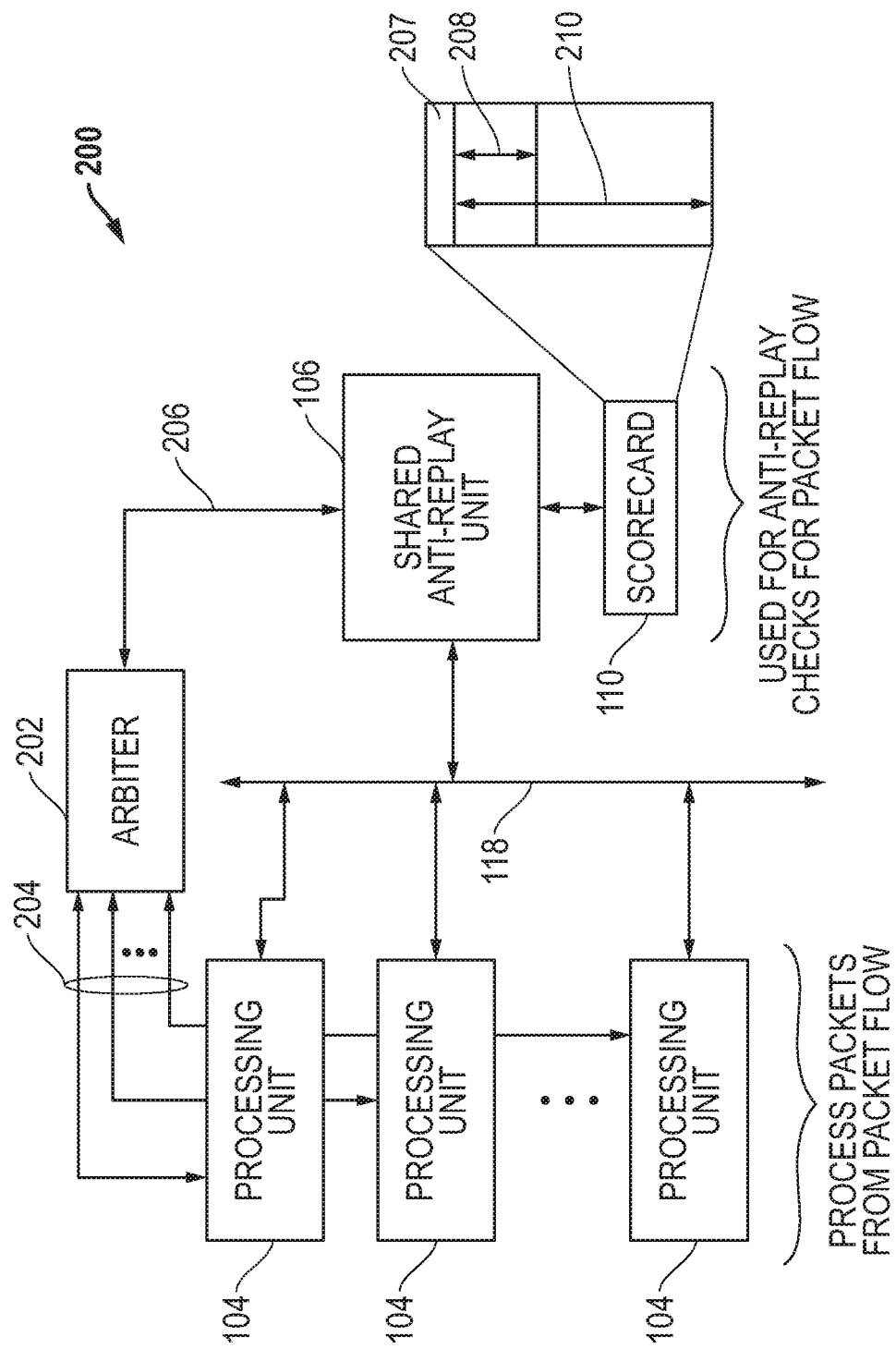
FIG. 2 is a block diagram of an example embodiment for multiple processing units that are processing packets within a packet flow in parallel and sharing a shared anti-replay unit for the anti-replay checks for that packet flow.

FIG. 2 is a block diagram of an example embodiment 200 for multiple processing units 104 that are processing packets within a packet flow and are sharing a shared anti-replay unit 106 for the anti-replay checks for that packet flow. The processing units 104 receive incoming packets associated with the packet flow through the system bus interconnects 118. The processing units 104 send access requests through messages 204 to the arbiter 202 to gain access through one or more data buses within the system bus interconnects 118 to the shared anti-replay unit 106 that is handling anti-replay checks for that packet flow. The arbiter 202 also communicates messages 206 with the shared anti-replay unit 106 and determines which processing unit 104 will have ownership of the bus to the shared anti-replay unit 106 at any given time. The processing units 104 can also send messages to each other directly and/or through the arbiter 202. As described herein, the processing units 104 work together in parallel to handle the jobs of processing packets received for the packet flow. These jobs can include, for example, identification of packet sequence numbers, decryption of packet contents, analysis of packet contents for corrupted data, security analyses of packet contents, anti-replay checks, late packet checks, and/or other packet processing tasks.

As described herein, the processing units 104 access and rely upon the anti-replay unit 106 selected and shared for a packet flow to provide the late packet checks and replay packet checks for that packet flow. During operation, the shared anti-replay unit 106 accesses and updates packet sequence numbers stored within a scorecard 110 that is managed by the shared anti-replay unit 106 for that packet flow. For certain further embodiments, a first window 208 is used for the initial late packet check and the initial replay packet check for each received packet. This first window 208 can also be programmed, configured, set, and/or otherwise selected by a user with respect to a desired window size for late packet checks. A second window 210 represents a maximum user-selectable size for the late packet checks. However, this second window 210 can also be used by the shared anti-replay unit 106 to store packet sequence numbers that are used for a final anti-replay check for received packets. As described herein, the initial check including late packet and replay packet checks are conducted after the packet is received and the packet sequence number is determined but before the packet is fully processed for security by a processing unit 104, and the final check including a replay packet check is conducted after security processing of the full packet contents have been completed by the processing unit 104 handling that packet. The scorecard is then updated after this final check has completed.

For one example embodiment, the first window 208 is a 32-bit window, a 64-bit window, or a 128-bit window of packet sequence numbers with respect to the newest packet sequence number that has been received, and the second window 210 is a 1024-bit window of packet sequence numbers with respect to the newest packet sequence number that has been received. For this example embodiment, the 32/64/128-bit window included within the first window 208 and the 1024-bit window included within the second window 210 represent offsets from the newest packet sequence number. The newest sequence number can be a 32-bit value, a 64-bit value, or some other bit length value that represents the packet sequence number for the newest packet received. This newest packet sequence number can be stored, for example, as an initial field 207 within the scorecard 110, and the remainder of the scorecard 110 represents packet sequence numbers starting with this newest packet sequence number. For example, assume that N is the sequence number for the newest packet and this newest packet sequence number is stored in an initial field 207. Then bit 0 of the windows 208/210 represents packet N; bit 1 represents packet N−1; bit 2 represents N−2; and so on. As such, a 1024-bit window means that bit 1023 represents packet N-1023. For this example embodiment, each bit in the first/second windows 208/210 for the scorecard 110 represents whether that relative packet number has been or has not been received. For example, a logic 0 can be used to represent that a relative packet number has not be received, and a logic 1 can be used to represent that this relative packet number has been received. These logic values could be reversed, if desired, and other techniques could also be used. Further, other tables and techniques could also be used to implement the scorecard 110.

For the initial check, if the packet sequence number for the current packet being processed is earlier than the packet sequence numbers stored within the first window 208, the received packet will be identified as a "late" packet. For the initial check, if the packet sequence number for the current packet being processed matches a packet sequence number stored in the first window 208, the received packet will be identified as a "replay" packet. For the final check, if the packet sequence number for the current packet being processed matches a packet sequence number stored in the second window 210, the received packet will be identified as a "replay" packet. Although a "late" determination is not made for the final check, a determination can still be made whether the packet sequence number for the current packet to be processed falls outside of the packet sequence numbers represented in the second window 210. If so, then the "replay" determination for this final check can be indicated as undetermined because it would not be known definitively whether no matching packets had already been received. As described herein, where the first window 208 is selected to be relatively small by a user, the use of a considerably larger second window 210 for the final check (e.g., at least sixteen times larger) allows for more robust anti-replay checks while still allowing a small user-selected window for "late" packet determinations.

Figure 3:
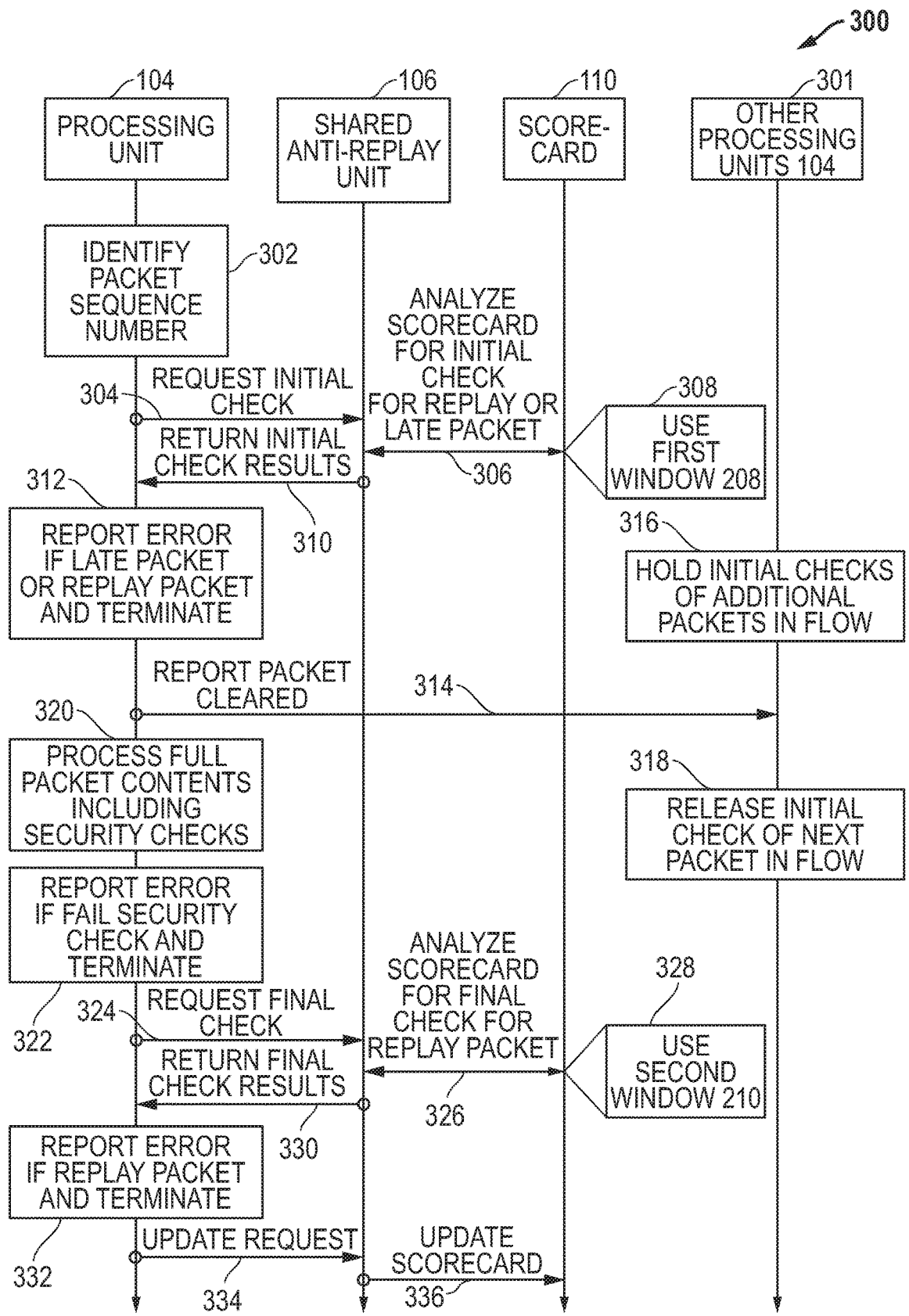
FIG. 3 is a swim lane diagram of an example embodiment for processing of a received packet within a packet flow by a processing unit using a shared anti-replay unit.

FIG. 3 is a swim lane diagram of an example embodiment 300 for processing of a received packet within a packet flow by a processing unit 104 using a shared anti-replay unit 106. It is noted that embodiment 300 is provided as an example embodiment and is not intended to limit the embodiments disclosed herein. It is further noted that additional and/or different operational steps can be included with respect to embodiment 300 while still taking advantage of the initial/final check techniques described herein for anti-replay processing.

As represented by block 302 for example embodiment 300, the processing unit 104 identifies the packet sequence number for the current packet being processed, for example, by extracting the packet sequence number. For the disclosed embodiments, this identification of the packet sequence number occurs before the security processing of the full packet contents has been completed by the processing unit 104. As represented by arrow 304, the processing unit 104 then sends a request to the shared anti-replay unit 106 for an initial check based upon the packet sequence number. The shared anti-replay unit 106 then accesses and analyzes the scorecard 110, as represented by arrow 306, to perform an initial check to determine if the received packet is a "late" packet and also to determine if the received packet is a "replay" packet. As indicated by block 308, the first window 208 is used for this initial check. As indicated above, the size of this first window 208 can be user selected. The shared anti-replay unit 106 returns the initial check results to the processing unit 104, as indicated by arrow 310. As indicated by block 312, if a late packet or a replay packet has been detected and identified by the initial check, the processing unit 104 reports the error and terminates. If not, then the processing unit 104 proceeds.

One or more other processing units 104 indicated with element number 301 on the right side of the swim lane diagram for embodiment 300 are assumed also to be processing received packets from the same packet flow. As indicated by block 316, the initial checks for later received packets (e.g., packet N+1, N+2 . . . ) from the packet flow that are being processed by these additional processing units 301 are held until the current received packet (e.g., packet N) clears the initial check. If the processing unit 104 proceeds from block 312 after receiving the initial check results, the processing unit 104 sends a message that is received by the other processing units 301 as indicated by arrow 314, and this message indicates that the current received packet (e.g., packet N) has cleared the initial check. The other processing units 301 wait until this current received packet clears its initial check and the corresponding message is received before having the initial check be released for the next packet within the packet flow (e.g., packet N+1) as indicated by block 318. As all of the processing units 104 are operating in parallel to process the packets received from the packet flow, each of the additional processing units 301 will be operating similarly to the processing unit 104 being addressed in embodiment 300. As such, each will generate packet clear messages when appropriate after initial checks are completed, and these packet clear messages from each of the processing units 104 allow the parallel processing to proceed at a faster rate than was possible with prior solutions where the entire packet contents for the current packet were processed and checked before proceeding. It is noted that the received packet order (e.g., packet N, N+1, N+2 . . . ) refers to the order the packets are received and not to the packet sequence number identified from the packet contents, for example, from a decrypted packet header. Typically, it is desirable for the processing units 104 working in parallel on packets received for a particular packet flow to process the received packets in the order they are received.

Looking now back to FIG. 3, the processing unit 104 proceeds with processing the full contents of the received packet including any other security checks as represented by block 320. For example, complex numerical algorithms are often applied to the full packet contents (e.g., once decrypted) for security processing to determine if packet contents have been corrupted and/or modified by a bad actor. Once the processing unit 104 has completed this security processing of the full packet contents, the processing unit 104 will report an error and terminate if an error is detected in this other security processing as indicated by block 322. If no error is detected, then the processing unit 104 sends a request to the shared anti-replay unit 106 for a final check based upon the packet sequence number as represented by arrow 324. The shared anti-replay unit 106 then accesses and analyzes the scorecard 110 based upon the packet sequence number of the current packet, as represented by arrow 326, to perform a final check to determine if the received packet is a "replay" packet without making a "late" packet determination. As indicated by block 328, the second window 210 is used for this final check. It is again noted that although a "late" packet determination is not made, a determination can still be made whether the packet sequence number is within a range of packet sequence numbers stored within the second window 210. If the packet falls outside this range, then the final check cannot be determined and an appropriate error message can be generated and sent. The shared anti-replay unit 106 returns the final check results to the processing unit 104, as indicated by arrow 330. As indicated by block 332, if a replay packet has been detected and identified, the processing unit 104 reports the error and terminates. If not, then the processing unit 104 proceeds and sends an update request message to the shared anti-replay unit 106, as indicated by arrow 334. The shared anti-replay unit 106 then accesses and updates the scorecard 110 as indicated by arrow 336 based upon the current packet just processed and successfully received. If the current packet is the newest packet received, the first/second windows 208/210 are updated based upon the packet sequence number for this newest received packet.

Figure 4:
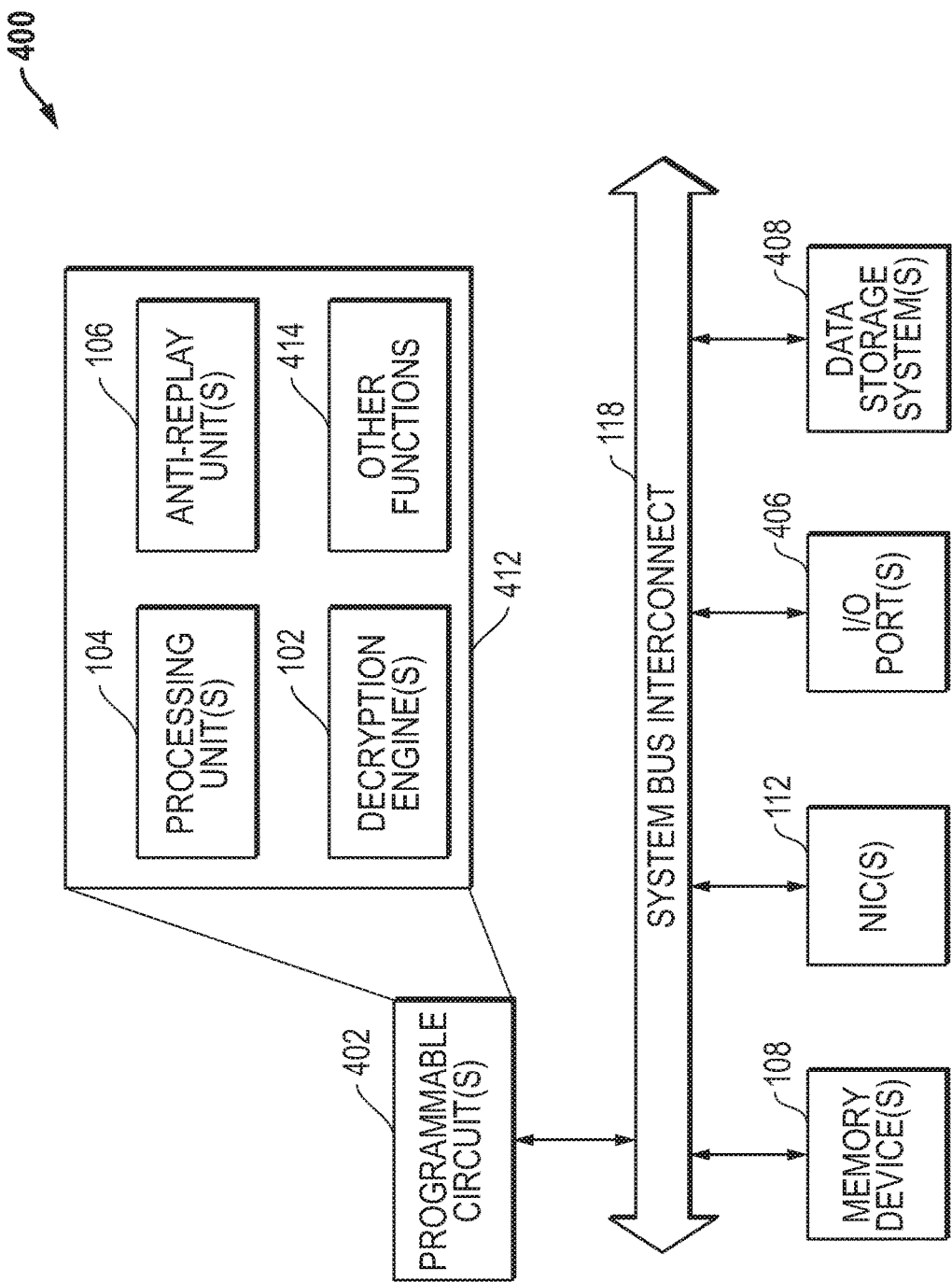
FIG. 4 is a block diagram of an example embodiment of a hardware environment that can be used to implement one or more of the components for the network system.

FIG. 4 is a block diagram of an example embodiment 400 of a hardware environment that can be used to implement one or more of the components for the network system 100 including the decryption engines 102, the processing units 104, the anti-replay units 106, and/or other processing functions 414 for the disclosed embodiments. For the example embodiment depicted, the hardware environment includes one or more programmable circuits 402, such as one or more processors or configurable logic devices, programmed or otherwise configured to implement one or more operational blocks or processing functions 412 for the embodiments described herein. The hardware environment also includes one or more network interface cards (NICs) that provide a network interface 112, one or more input/output (I/O) ports 406, one or more data storage systems 408, and one or more memory devices 108 coupled to communicate with each other through the system bus interconnect 118. The data storage systems 408 can store one or more software modules that represent software code or other program instructions that can be executed by the programmable circuits 402 to carry out the functions described herein. In operation, the programmable circuits 402 load and execute software code and/or programming instructions stored in the data storage systems 408 to perform the processing functions described herein. For example, the decryption engines 102, the processing units 104, and/or the anti-replay units 106 can be implemented using hardware logic and/or software or program instructions that when executed by the one or more programmable circuits 402 cause the functions described herein to be performed. The memory devices 108 can be used by the programmable circuits 402 to load and execute the software instructions stored in the data storage systems 408 and to store the scorecards 110 as described herein. It is also noted that different and/or additional components could also be used while still taking advantage of the anti-replay check techniques described herein. It is further noted that the system bus interconnect 118 can be implemented as multiple interconnection buses with or without additional intervening circuitry. Further, it is noted that the programmable circuits 402 can be implemented using one or more processing devices including controllers, microcontrollers, microprocessors, central processing units, hardware logic, hardware accelerators, configurable logic devices (e.g., field programmable gate arrays), and/or other processing devices that are programmed to perform the described functions. In addition, data storage systems 408 can be implemented as any desired non-transitory tangible computer readable medium that stores data, such as data storage devices, FLASH memory, random access memory, read only memory, programmable memory devices, reprogrammable storage devices, hard drives, floppy disks, DVDs, CD-ROMs, and/or any other non-transitory data storage mediums. The memory devices 108 can be any such data storage medium configured to maintain data storage when the network device is powered. Other variations could also be implemented.

As described herein, a variety of embodiments can be implemented and different features and variations can be implemented, as desired.

For one embodiment, a system for packet replay protection is disclosed including a memory configured to store a scorecard that represents packet sequence numbers for received packets associated with a network packet flow and an anti-replay unit programmed for each of the received packets to access the scorecard for an initial check to determine if the current packet represents a late packet and also to determine if the current packet represents a replay packet based upon a packet sequence number for a current packet and to access the scorecard for a final check to determine if the current packet represents a replay packet based upon the packet sequence number for the current packet.

In additional embodiments, the initial check is based upon a first window of packet sequence numbers within the scorecard; the final check is based upon a second window of packet sequence numbers within the scorecard; and the second window is larger than he first window. In further embodiments, the first window and the second window both include bits representing packet sequence numbers relative to a newest packet sequence number.

In additional embodiments for the initial check, the current packet is identified as a late packet if the packet sequence number for the current packet is outside a range of packet sequence numbers represented within the first window, and the current packet is identified as a replay packet if the packet sequence number for the current packet matches a packet sequence number represented within the first window. In further embodiments, for the final check, the current packet is identified as a replay packet if the packet sequence number for the current packet matches a packet sequence number represented within the second window, and a determination is also made whether the packet sequence number for the current packet is outside a range of packet sequence numbers represented within the second window.

In additional embodiments, the system also includes a plurality of processing units configured to process the received packets in parallel and to share the anti-replay unit, and each processing unit is further configured to request the initial check and the final check from the anti-replay unit for each received packet it processes. In further embodiments, the processing units are configured to process the received packets in an order that they were received and to wait until a received packet clears its initial check before proceeding with an initial check for a next received packet. In still further embodiments, the anti-replay unit is configured to update the scorecard after each received packet clears its final check.

In additional embodiments, the processing units are configured to identify the packet sequence number for the current packet and to request the initial check based upon the packet sequence number prior to completing other security processing for the current packet. In further embodiments, the processing units are configured to request the final check after completing the other security processing for the current packet.

For one embodiment, a method for packet replay protection is disclosed including receiving packets associated with a network packet flow and storing a scorecard, the scorecard representing packet sequence numbers for the received packets. The method further includes, for each received packet, performing an anti-replay check with an anti-replay unit by accessing the scorecard for an initial check to determine if the current packet represents a late packet and also to determine if the current packet represents a replay packet based upon a packet sequence number for a current packet and accessing the scorecard for a final check to determine if the current packet represents a replay packet based upon a packet sequence number for a current packet.

In additional embodiments, the initial check is based upon a first window of packet sequence numbers within the scorecard; the final check is based upon a second window of packet sequence numbers within the scorecard; and the second window is larger than the first window. In further embodiments, the first window and the second window both include bits representing packet sequence numbers relative to a newest packet sequence number.

In additional embodiments, the method further includes, for the initial check, identifying the current packet as a late packet if the packet sequence number for the current packet is outside a range of packet sequence numbers represented within the first window and identifying the current packet as a replay packet if the packet sequence number for the current packet matches a packet sequence number represented within the first window. In further embodiments, the method includes, for the final check, identifying the current packet as a replay packet if the packet sequence number for the current packet matches a packet sequence number represented within the second window and determining whether the packet sequence number for the current packet is outside a range of packet sequence numbers represented within the second window.

In additional embodiments, the method further includes using a plurality of processing units to process the received packets in parallel and to share the anti-replay unit, and each processing unit requests the initial check and the final check from the anti-replay unit for each received packet it processes. In further embodiments, the method includes, with the plurality of processing units, processing the received packets in an order that they were received and waiting until a received packet clears its initial check before proceeding with an initial check for a next received packet. In still further embodiments, the method includes updating the scorecard after each received packet clears its final check.

In additional embodiments, the method includes, with the plurality of processing units, identifying the packet sequence number for the current packet and requesting the initial check based upon the packet sequence number prior to completing other security processing for the current packet. In further embodiments, the method includes, with the plurality of processing units, requesting the final check after completing the other security processing for the current packet.

It is further noted that the functional blocks, components, systems, devices, and/or circuitry described herein (e.g., decryption engines 102, the processing units 104, the anti-replay units 106, and/or other processing functions 414 for the disclosed embodiments) can be implemented using hardware, software, or a combination of hardware and software. For example, the disclosed embodiments can be implemented using one or more programmable circuits that are programmed to perform the functions, tasks, methods, actions, and/or other operational features described herein for the disclosed embodiments. The one or more programmable circuits can include, for example, one or more processors and/or configurable logic devices (CLDs). The one or more processors can be, for example, one or more central processing units (CPUs), controllers, microcontrollers, microprocessors, hardware accelerators, ASICs (application specific integrated circuit), and/or other integrated processing devices. The one or more CLDs can be, for example, one or more CPLDs (complex programmable logic devices), FPGAs (field programmable gate arrays), PLAs (programmable logic array), reconfigurable logic circuits, and/or other integrated logic devices. Further, the programmable circuits, including the one or more processors, can be configured to execute software, firmware, code, and/or other program instructions that are embodied in one or more non-transitory tangible computer-readable mediums to perform the functions, tasks, methods, actions, and/or other operational features described herein for the disclosed embodiments. The programmable circuits, including the one or more CLDs, can also be programmed using logic code, logic definitions, hardware description languages, configuration files, and/or other logic instructions that are embodied in one or more non-transitory tangible computer-readable mediums to perform the functions, tasks, methods, actions, and/or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, and/or any other non-transitory tangible computer-readable mediums. Other variations can also be implemented while still taking advantage of the techniques described herein.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. A system for packet replay protection, comprising:
a memory configured to store a scorecard, the scorecard representing packet sequence numbers for received packets associated with a network packet flow; and
one or more programmable circuits including one or more processors or configurable logic devices programmed to provide an anti-replay unit to receive the received packets and for each received packet to:
access the scorecard for an initial check, wherein the initial check is performed prior to packet processing and during the initial check the programmable circuits are configured to
determine if a current packet represents a late packet, and
determine if the current packet represents a replay packet based upon a packet sequence number for the current packet; and
access the scorecard for a final check, wherein the final check is performed subsequent to the initial check and subsequent to packet processing and during the final check the programmable circuits are configured to
determine if the current packet represents a replay packet based upon the packet sequence number for the current packet, and
update the scorecard, wherein updating the scorecard is only performed during the final check;
wherein the initial check is based upon a first window of packet sequence numbers within the scorecard;
wherein the final check is based upon a second window of packet sequence numbers within the scorecard; and
wherein the second window is larger than and includes the first window.

2. The system of claim 1, wherein the first window and the second window both comprise bits representing packet sequence numbers relative to a newest packet sequence number.

3. The system of claim 1, wherein for the initial check, the current packet is identified as a late packet if the packet sequence number for the current packet is outside a range of packet sequence numbers represented within the first window, and wherein the current packet is identified as a replay packet if the packet sequence number for the current packet matches a packet sequence number represented within the first window.

4. The system of claim 1, wherein for the final check, the current packet is identified as a replay packet if the packet sequence number for the current packet matches a packet sequence number represented within the second window, and wherein a determination is also made whether the packet sequence number for the current packet is outside a range of packet sequence numbers represented within the second window.

5. The system of claim 1, further comprising a second set of one or more programmable circuits including one or more processors or configurable logic devices programmed to provide a second set of a plurality of processing units configured to process the received packets in parallel and to share the anti-replay unit, each processing unit being further configured to request the initial check and the final check from the anti-replay unit for each received packet it processes.

6. The system of claim 5, wherein the second set of processing units are further configured to process the received packets in an order that they were received and to wait until a received packet clears its initial check before proceeding with an initial check for a next received packet.

7. The system of claim 5, wherein the anti-replay unit is configured to update the scorecard after each received packet clears its final check.

8. The system of claim 5, wherein the second set of processing units are configured to identify the packet sequence number for the current packet and to request the initial check based upon the packet sequence number prior to completing other security processing for the current packet.

9. The system of claim 8, wherein the second set of processing units are configured to request the final check after completing the other security processing for the current packet.

10. A method for packet replay protection, comprising:
receiving packets associated with a network packet flow;
storing a scorecard, the scorecard representing packet sequence numbers for the received packets; and
for each received packet, performing an anti-replay check by:
accessing the scorecard for an initial check, wherein the initial check is performed prior to packet processing, the initial check determines if a current packet represents a late packet and also determines if the current packet represents a replay packet based upon a packet sequence number for the current packet; and
accessing the scorecard for a final check, wherein the final check is performed subsequent to the initial check and subsequent to packet processing, the final check determines if the current packet represents a replay packet based upon the packet sequence number for a current packet, and updates the scorecard, wherein updating the scorecard is only performed during the final check;
wherein the initial check is based upon a first window of packet sequence numbers within the scorecard;
wherein the final check is based upon a second window of packet sequence numbers within the scorecard; and
wherein the second window is larger than and includes the first window.

11. The method of claim 10, wherein the first window and the second window both comprise bits representing packet sequence numbers relative to a newest packet sequence number.

12. The method of claim 10, further comprising, for the initial check, identifying the current packet as a late packet if the packet sequence number for the current packet is outside a range of packet sequence numbers represented within the first window, and identifying the current packet as a replay packet if the packet sequence number for the current packet matches a packet sequence number represented within the first window.

13. The method of claim 10, further comprising, for the final check, identifying the current packet as a replay packet if the packet sequence number for the current packet matches a packet sequence number represented within the second window, and also determining whether the packet sequence number for the current packet is outside a range of packet sequence numbers represented within the second window.

14. The method of claim 10, further comprising operating one or more programmable circuits including one or more processors or configurable logic devices to provide a plurality of processing units, and using the plurality of processing units to process the received packets in parallel, each processing unit requesting the initial check and the final check for the anti-replay check for each received packet it processes.

15. The method of claim 14, further comprising, with the plurality of processing units, processing the received packets in an order that they were received and waiting until a received packet clears its initial check before proceeding with an initial check for a next received packet.

16. The method of claim 14, further comprising updating the scorecard after each received packet clears its final check.

17. The method of claim 14, further comprising, with the plurality of processing units, identifying the packet sequence number for the current packet and requesting the initial check based upon the packet sequence number prior to completing other security processing for the current packet.

18. The method of claim 17, further comprising, with the plurality of processing units, requesting the final check after completing the other security processing for the current packet.

* * * * *